(12) United States Patent
Weder et al.

(10) Patent No.: US 11,319,054 B2
(45) Date of Patent: May 3, 2022

(54) WING ARRANGEMENT FOR AN AIRCRAFT

(71) Applicant: Airbus Operations GmbH, Hamburg (DE)

(72) Inventors: Paul Weder, Hamburg (DE); Saskia Dege, Bremen (DE); Svenja Jegminat, Bremen (DE)

(73) Assignee: AIRBUS OPERATIONS GmbH, Hamburg (DE)

( * ) Notice: Subject to any disclaimer, the term of this patent is extended or adjusted under 35 U.S.C. 154(b) by 378 days.

(21) Appl. No.: 16/426,190

(22) Filed: May 30, 2019

(65) Prior Publication Data
US 2019/0367154 A1     Dec. 5, 2019

(30) Foreign Application Priority Data

May 31, 2018  (DE) .......................... 102018113081.3

(51) Int. Cl.
*B64C 3/56*           (2006.01)
(52) U.S. Cl.
CPC ...................................... *B64C 3/56* (2013.01)
(58) Field of Classification Search
CPC .... B64C 3/56; B64C 3/54; B64C 1/30; B64C 3/00; B64C 3/42; B64C 5/08; B64C 5/10; B64C 23/65; B64C 23/72; Y02T 50/30; Y02T 50/10
See application file for complete search history.

(56) References Cited

U.S. PATENT DOCUMENTS

| 262,451   | A | * | 8/1882 | McFarlane ............. B62D 7/023 |
| | | | | 280/137.504 |
| 1,348,374 | A | * | 8/1920 | Plym ........................ B64C 3/00 |
| | | | | 244/123.8 |

(Continued)

FOREIGN PATENT DOCUMENTS

| DE | 10 2016 002 468 | 8/2017 |
| EP | 3 000 723 | 3/2016 |
| EP | 3 093 233 | 11/2016 |

OTHER PUBLICATIONS

German Search Report for DE 10 2018 113 081.3 dated Feb. 5, 2019, 9 pages.

(Continued)

*Primary Examiner* — Medhat Badawi
(74) *Attorney, Agent, or Firm* — Nixon & Vanderhye P.C.

(57) ABSTRACT

A wing arrangement for an aircraft is disclosed including a wing having a base section with a first end portion, which is adapted to be secured to the fuselage of an aircraft, and an opposite second end portion, and a tip section with a third end portion and an opposite fourth end portion. The third end portion is pivotably connected to the second end portion such that the tip section (9) is selectively pivotable about a tip section pivot axis between a deployed position and a folded position in which the spanwise length of the wing is smaller than in the deployed position. An actuating system including an actuator and coupled between the base section and the tip section such that the actuator is operable to selectively move the tip section between the deployed position and the folded position. The actuating system includes at least one first component arranged and adapted to move upon operating the actuator.

11 Claims, 3 Drawing Sheets

(56) References Cited

U.S. PATENT DOCUMENTS

| | | | | | |
|---|---|---|---|---|---|
| 1,779,113 A * | 10/1930 | Carns | B64C 9/00 244/123.9 |
| 1,803,030 A * | 4/1931 | Messerschmitt | B64C 3/00 244/123.8 |
| 1,804,823 A * | 5/1931 | Blondin | B64C 3/00 244/123.1 |
| 1,806,586 A * | 5/1931 | Christmas | B64C 3/00 244/123.4 |
| 1,819,794 A * | 8/1931 | Schultze | B64C 3/56 244/49 |
| 1,956,823 A * | 5/1934 | Carns | B64C 3/00 244/123.4 |
| 2,222,997 A * | 11/1940 | Bellanca | B64C 3/54 244/90 R |
| 2,289,224 A * | 7/1942 | Anderson | B64C 3/56 244/49 |
| 2,292,613 A * | 8/1942 | Chapman | B64C 3/54 244/218 |
| 2,375,075 A * | 5/1945 | Carruth | B64D 47/06 362/470 |
| 2,420,433 A * | 5/1947 | Kraaymes | B64C 3/54 244/218 |
| 2,468,425 A * | 4/1949 | Carpenter | B64C 3/56 74/520 |
| 2,712,421 A * | 7/1955 | Naumann | B64C 3/56 244/49 |
| 2,719,682 A * | 10/1955 | Handel | B64C 3/56 244/49 |
| 2,881,989 A * | 4/1959 | Flettner | B64C 27/26 244/6 |
| 2,881,994 A * | 4/1959 | Michael | B64C 3/26 244/124 |
| 3,039,721 A * | 6/1962 | Rogers, Jr. | B64D 37/04 244/135 R |
| 3,139,248 A * | 6/1964 | Alvarez-Calderon | B64C 3/42 244/207 |
| 3,333,792 A * | 8/1967 | Alvarez-Calderon | B64C 3/54 244/218 |
| 3,645,477 A * | 2/1972 | Kratschmar | B64C 3/40 244/46 |
| 3,737,121 A * | 6/1973 | Jones | B64C 3/40 244/13 |
| 4,061,195 A * | 12/1977 | Pryor | A01B 73/044 172/456 |
| 4,228,977 A * | 10/1980 | Tanaka | A63H 27/08 244/153 R |
| 4,245,804 A * | 1/1981 | Ishimitsu | B64C 23/069 244/91 |
| 4,247,062 A * | 1/1981 | Brueckner | B64C 5/08 244/36 |
| 4,247,063 A * | 1/1981 | Jenkins | B64C 5/08 244/91 |
| 4,457,479 A * | 7/1984 | Daude | B64C 5/08 244/203 |
| 4,497,461 A * | 2/1985 | Campbell | B64C 9/00 244/99.3 |
| 4,598,885 A * | 7/1986 | Waitzman | B64C 23/076 244/13 |
| 4,671,470 A * | 6/1987 | Jonas | B29C 66/54 244/119 |
| 4,671,473 A * | 6/1987 | Goodson | B64C 23/076 244/199.4 |
| 4,717,093 A * | 1/1988 | Rosenberger | F42B 10/16 244/49 |
| 4,722,499 A * | 2/1988 | Klug | B64C 23/076 244/199.4 |
| 4,824,053 A * | 4/1989 | Sarh | B23Q 1/601 244/218 |
| 4,881,700 A * | 11/1989 | Sarh | B60F 5/02 244/2 |
| 4,986,493 A * | 1/1991 | Sarh | B60F 5/02 244/2 |
| 5,040,747 A * | 8/1991 | Kane | B64C 25/26 244/102 R |
| 5,072,894 A * | 12/1991 | Cichy | B64C 5/08 244/91 |
| 5,201,479 A * | 4/1993 | Renzelmann | B64C 3/56 244/49 |
| 5,229,921 A * | 7/1993 | Bohmer | G06F 1/1679 16/324 |
| 5,288,037 A * | 2/1994 | Derrien | B64C 25/26 244/102 SL |
| 5,288,039 A * | 2/1994 | DeLaurier | B64C 33/02 244/219 |
| 5,310,138 A * | 5/1994 | Fitzgibbon | B64C 3/56 244/49 |
| 5,348,253 A * | 9/1994 | Gratzer | B64C 23/069 244/91 |
| 5,350,135 A * | 9/1994 | Renzelmann | B64C 3/56 244/49 |
| 5,356,094 A * | 10/1994 | Sylvain | B64C 3/56 244/123.9 |
| 5,379,969 A * | 1/1995 | Marx | B64C 3/56 244/49 |
| 5,381,986 A * | 1/1995 | Smith | B64C 3/56 244/49 |
| 5,407,153 A * | 4/1995 | Kirk | B64C 23/069 244/199.4 |
| 5,427,329 A * | 6/1995 | Renzelmann | B64C 3/56 244/49 |
| 5,558,299 A * | 9/1996 | Veile | B64C 3/56 244/49 |
| 5,645,250 A * | 7/1997 | Gevers | B64D 27/00 244/101 |
| 5,988,563 A * | 11/1999 | Allen | B64C 3/56 244/49 |
| 6,076,766 A * | 6/2000 | Gruensfelder | B64C 3/56 244/130 |
| 6,190,484 B1 * | 2/2001 | Appa | B29C 70/32 156/189 |
| 6,224,012 B1 * | 5/2001 | Wooley | B60F 5/02 244/121 |
| 6,227,487 B1 * | 5/2001 | Clark | B64C 23/072 244/99.12 |
| 6,260,799 B1 * | 7/2001 | Russ | B64C 3/56 244/49 |
| 6,345,790 B1 * | 2/2002 | Brix | B64C 23/076 244/199.4 |
| 6,834,835 B1 * | 12/2004 | Knowles | B64C 3/54 244/198 |
| 7,137,589 B2 * | 11/2006 | Arata | B64C 27/26 244/6 |
| 7,497,403 B2 * | 3/2009 | McCarthy | B64C 23/072 244/199.4 |
| 8,089,034 B2 * | 1/2012 | Hammerquist | B64C 3/56 244/3.28 |
| 8,276,842 B2 * | 10/2012 | Kracke | B64C 13/28 244/99.4 |
| 8,651,431 B1 * | 2/2014 | White | B64C 23/076 244/218 |
| 8,733,692 B2 * | 5/2014 | Kordel | B64C 23/072 244/49 |
| 8,777,153 B2 * | 7/2014 | Parker | B64C 3/56 244/49 |
| 8,919,703 B2 * | 12/2014 | Parker | B64C 7/00 244/215 |
| 8,998,132 B2 * | 4/2015 | Burris | B64C 9/04 244/99.3 |
| 9,162,755 B2 * | 10/2015 | Guida | B64C 23/069 |
| 9,211,946 B2 * | 12/2015 | Good | B64C 3/56 |
| 9,296,469 B2 * | 3/2016 | Santini | B64C 3/56 |
| 9,415,857 B2 * | 8/2016 | Fox | B64C 3/56 |
| 9,469,391 B1 * | 10/2016 | Dong | B64C 23/076 |
| 9,469,392 B2 * | 10/2016 | Fox | B64C 23/072 |
| 9,701,392 B2 * | 7/2017 | Whitlock | B64C 3/26 |
| 9,896,186 B2 * | 2/2018 | Fong | B29C 70/222 |
| 9,908,612 B2 * | 3/2018 | Fox | B64C 3/56 |
| 9,914,523 B2 * | 3/2018 | Good | B64C 3/56 |

(56) References Cited

U.S. PATENT DOCUMENTS

| | | | | |
|---|---|---|---|---|
| 10,189,557 B2* | 1/2019 | Boye | | B64C 3/56 |
| 10,227,128 B2* | 3/2019 | Korya | | B64C 3/56 |
| 10,501,167 B2* | 12/2019 | Kracke | | B64C 3/56 |
| 11,066,148 B2* | 7/2021 | Elenbaas | | B64C 13/34 |
| 2003/0155839 A1* | 8/2003 | Krimmer | | H01F 7/1607 |
| | | | | 310/264 |
| 2004/0000619 A1* | 1/2004 | Barriety | | B64C 3/52 |
| | | | | 244/219 |
| 2004/0262451 A1* | 12/2004 | McLean | | B64C 3/10 |
| | | | | 244/45 R |
| 2005/0133672 A1* | 6/2005 | Irving | | B64C 23/072 |
| | | | | 244/201 |
| 2005/0230531 A1* | 10/2005 | Horinouchi | | B64C 3/40 |
| | | | | 244/47 |
| 2005/0276657 A1* | 12/2005 | Yumikino | | A61F 5/0125 |
| | | | | 403/92 |
| 2007/0262207 A1* | 11/2007 | Morgenstern | | B64C 9/22 |
| | | | | 244/214 |
| 2008/0191099 A1* | 8/2008 | Werthmann | | B64C 23/065 |
| | | | | 244/199.4 |
| 2008/0308683 A1* | 12/2008 | Sankrithi | | B64C 23/076 |
| | | | | 244/199.4 |
| 2009/0148302 A1* | 6/2009 | Leahy | | B64C 27/463 |
| | | | | 416/224 |
| 2009/0166477 A1* | 7/2009 | Bousfield | | B64C 3/18 |
| | | | | 244/218 |
| 2009/0224107 A1* | 9/2009 | McLean | | B64C 23/069 |
| | | | | 244/199.4 |
| 2009/0302151 A1* | 12/2009 | Holmes | | B64C 3/56 |
| | | | | 244/49 |
| 2010/0019080 A1* | 1/2010 | Schweighart | | B64C 3/56 |
| | | | | 244/49 |
| 2010/0051742 A1* | 3/2010 | Schweighart | | B64C 3/56 |
| | | | | 244/49 |
| 2010/0084516 A1* | 4/2010 | Eberhardt | | B64C 23/072 |
| | | | | 244/218 |
| 2011/0180657 A1* | 7/2011 | Gionta | | B64C 3/56 |
| | | | | 244/49 |
| 2012/0032023 A1* | 2/2012 | Bousfield | | B64C 3/56 |
| | | | | 244/49 |
| 2012/0112005 A1* | 5/2012 | Chaussee | | B64C 23/072 |
| | | | | 244/123.1 |
| 2012/0292436 A1* | 11/2012 | Karem | | B64C 3/56 |
| | | | | 244/49 |
| 2013/0001367 A1* | 1/2013 | Boer | | B64C 23/072 |
| | | | | 244/199.3 |
| 2013/0056579 A1* | 3/2013 | Schlipf | | B64C 3/56 |
| | | | | 244/49 |
| 2013/0099060 A1* | 4/2013 | Dees | | B64C 3/56 |
| | | | | 244/199.4 |
| 2014/0014768 A1* | 1/2014 | Lassen | | B64C 3/56 |
| | | | | 244/49 |
| 2014/0361539 A1* | 12/2014 | Carter | | F03D 7/06 |
| | | | | 290/44 |
| 2015/0014478 A1* | 1/2015 | Lassen | | B64C 3/56 |
| | | | | 244/49 |
| 2015/0097087 A1* | 4/2015 | Sakurai | | B64C 3/40 |
| | | | | 244/201 |
| 2015/0191243 A1* | 7/2015 | Fujimoto | | B64C 17/00 |
| | | | | 244/7 R |
| 2016/0090170 A1* | 3/2016 | Thompson | | B64C 3/56 |
| | | | | 701/3 |
| 2016/0185444 A1* | 6/2016 | Gionta | | B64C 3/56 |
| | | | | 244/49 |
| 2016/0244145 A1* | 8/2016 | Thompson | | B64C 23/072 |
| 2016/0251075 A1* | 9/2016 | Thompson | | B64C 23/072 |
| | | | | 244/198 |
| 2016/0332723 A1* | 11/2016 | Korya | | B64C 3/56 |
| 2016/0362171 A1* | 12/2016 | Lassen | | B64C 3/56 |
| 2017/0029089 A1* | 2/2017 | Alexander | | B64C 3/40 |
| 2017/0043864 A1* | 2/2017 | Axford | | B64C 3/56 |
| 2017/0349296 A1* | 12/2017 | Moy | | B64C 3/56 |
| 2017/0355438 A1* | 12/2017 | Bishop | | B64C 3/56 |
| 2017/0355444 A1* | 12/2017 | Lorenz | | B64C 3/56 |
| 2018/0057144 A1* | 3/2018 | Lorenz | | B64C 3/56 |
| 2018/0237127 A1* | 8/2018 | Hewson | | B64C 3/187 |
| 2019/0248468 A1* | 8/2019 | Lorenz | | B64C 3/56 |
| 2019/0322351 A1* | 10/2019 | Lorenz | | F16D 55/38 |
| 2019/0337605 A1* | 11/2019 | Lorenz | | B64C 3/56 |
| 2019/0359311 A1* | 11/2019 | Lorenz | | B64C 3/56 |
| 2019/0359312 A1* | 11/2019 | Lorenz | | B64C 3/56 |
| 2019/0367154 A1* | 12/2019 | Weder | | B64C 3/56 |
| 2019/0389559 A1* | 12/2019 | Lorenz | | B64C 3/56 |
| 2020/0398969 A1* | 12/2020 | Lorenz | | B64C 3/56 |

OTHER PUBLICATIONS

Translation Certificate and English Translation of German Search Report issued in DE 10 2018 113081.3, dated Feb. 5, 2019, 10 pages.

* cited by examiner

WING ARRANGEMENT FOR AN AIRCRAFT

CROSS REFERENCE TO RELATED APPLICATION

This application claims priority to and incorporates by reference German Application Number DE 10 2018 113081.3, filed May 31, 2018.

BACKGROUND

1. Field of the Invention

The present disclosure relates a wing arrangement for an aircraft comprising a wing having a base section having a first end portion and an opposite second end portion, wherein the first end portion is adapted to be secured to the fuselage of an aircraft, and a tip section having a third end portion and an opposite fourth end portion, wherein the third end portion is pivotably connected to the second end portion such that the tip section is pivotable about a pivot axis between a deployed position and a stowed position in which the spanwise length of the wing is smaller than in the deployed position.

2. Description of Related Art

The aspect ratio, i.e. the ratio of span to chord, of an aircraft wing is one factor influencing the efficiency of the aircraft during flight. Generally, an increase of the aspect ratio is associated with an increased efficiency during steady flight. Therefore, an increase of the wingspan of an aircraft is one factor to take into consideration when seeking to reduce fuel consumption. However, when elongating the wing of an existing family of aircraft, it may become necessary to adapt the aircraft family specific infrastructure, and airport fees may increase.

One possibility to increase the wingspan without having to adapt the aircraft family specific infrastructure and having to deal with increased airport fees, or to reduce airport fees for existing aircraft is to provide for a foldable wing construction of the above type which allows to pivotably move an outboard end portion of the wing between a deployed position, in which the wing has its normal flight configuration, and a folded or stowed position, in which the wing has a folded configuration and the wingspan is decreased as compared to the deployed position.

When the wing has been brought into the folded position, it is necessary to be able to reliably retain or latch the wing in the folded position. Therefore, foldable wings comprise suitable means for this purpose.

SUMMARY

A wing arrangement having a foldable wing which is safe and reliable in operation and has at the same time a simple construction with low weight and low space requirements is disclosed.

The wing arrangement is defined in claim 1 and by an aircraft as defined in claim 0. Exemplary embodiments of the wing arrangement are defined in the respective dependent claims.

According to an exemplary embodiment, a wing arrangement for an aircraft is provided. The wing arrangement comprises a wing having a base section, or fixed wing, and a tip section, or foldable wing tip portion.

The base section has a first end portion, which is adapted to be secured to the fuselage of an aircraft, and an opposite second end portion. Thus, when the wing is mounted to a fuselage of an aircraft at its first end portion the second end portion of the base section is remote from the fuselage, i.e., a terminal end of the first end portion constitutes the inboard end of the base section and of the entire wing and an opposite terminal end of the second end portion constitutes the outboard end of the base section.

The tip section has a third end portion and an opposite fourth end portion. The third end portion is pivotably connected to the second end portion such that the tip section is pivotable about a pivot axis between a deployed or extended position, which may be defined by a first tip section stop mechanism, and a folded or stowed position, in which the spanwise length of the wing is smaller than in the deployed position and which may be defined by a second tip section stop mechanism. In other words, when two of the wings are mounted to opposite sides of a fuselage of an aircraft, the length of the shortest straight line between the outermost wingtips of the two wings is larger—and may be maximized—in the deployed position than in the folded position, i.e., the length of the wing measured along the y-axis or pitch axis of the aircraft is larger—and may be maximized—in the deployed position than in the folded position. In particular, the distance between the first end portion and the fourth end portion may be larger—and may be maximized—in the deployed position than in the folded position.

The pivot axis may be oriented in a direction extending between a first edge and a second edge of the wing opposite to each other in a chord direction of the wing, and may be in the local chord direction and/or in a flight direction of an aircraft to which the wing arrangement is mounted. Thus, when moving the tip section from the deployed position into the folded position, the tip section is pivoted downwardly or, upwardly with respect to the base section. Alternatively, the pivot axis may be oriented in a vertical direction and/or in a wing depth direction and/or in a direction transverse or perpendicular to the wing surface. In that case, when moving the tip section from the deployed position into the folded position, the tip section may be pivoted forwardly or rearwardly with respect to the base section.

Thus, when the wing is mounted to a fuselage of an aircraft at its first end portion, and at least in the deployed position of the tip section, the third end portion of the tip section is spaced from the fuselage by the base section and the fourth end portion is the outermost portion of the wing, i.e., a terminal end of the third end portion constitutes the inboard end of the tip section and an opposite terminal end of the fourth end portion constitutes the outboard end of the tip section and of the entire wing.

It is to be noted that, in case the wing includes a wing tip device, the tip section may be identical to the wing tip device, but that the tip section may comprise the wing tip device and additionally a further portion of the wing at the inboard side of the wing tip device. In this regard, in the usual manner wing tip devices are understood as devices or wing sections installed at the outermost end of a wing and being adapted to increase the effective aspect ratio of a wing without materially increasing the wingspan and to reduce drag by partially recovering the energy of tip vortices.

The wing arrangement further comprises an actuating system or unit, which includes an actuator. The actuating system is coupled between the base section and the tip section in such a manner that the actuator is operable to selectively move the tip section between the deployed position and the folded position. The actuator may be, e.g., a linear hydraulic actuator, a rotary actuator, a rack and pinion drive or any other suitable type of actuator.

The actuating system comprises one or more first components, which are referred to as actuating or transmission components. Each of the first components is arranged and adapted to move upon operating or actuating the actuator, thereby transferring an actuation movement, which is effected by the actuator, to the tip section in order to effect the selective movement of the tip section between the deployed and folded positions. For this purpose, the respective one of the first components, which is movable supported, may be coupled directly to the tip section, so that the actuation movement is transferred directly from the first component to the tip section, or the transfer may be indirectly via one or more intermediate transmission components disposed between the respective first component and the tip section. Such intermediate transmission components may be, e.g., one or more others of the first components. Generally, the actuating system may comprise, in addition to the actuator, one or more additional components arranged and adapted to transfer the actuating movement from the actuator to the tip section, such as a gearbox, a shaft and/or a structural kinematic link arranged between the actuator and the tip section. Each of the first components may be one of such additional components or may be part of the actuator, such as an output shaft or piston rod of the actuator.

The actuating system also comprises one or more brakes adapted to be selectively switched between an engaged mode and a disengaged mode at least when the tip section is in the folded position, such that in the engaged mode the one or more brakes secure or latch the tip section in the folded position by applying a braking force to an associated one of the first components preventing movement thereof, and in the disengaged mode movement of the tip section between the folded and deployed positions is allowed by the one or more brakes. Thus, the one or more brakes are incorporated into the actuating system and are an integral part of the actuating system.

The above-described wing arrangement is of a simple construction and can be configured to be of low weight, and is nevertheless capable of providing for reliable operation. For example, the one or more brakes do not require accurate positioning of the tip section in the folded position prior to being switched into the engaged mode. Rather, different from configurations utilizing, e.g., bolts which are driven into bores for latching purposes, they are also able to apply a braking force and secure the tip section in its position if its position somewhat deviates from the folded position. Consequently, positioning the tip section against an end step, such as the second tip section stop mechanism mentioned above, is not necessary. It may even be possible to dispense with the need to position the tip section against such an end stop. The wing arrangement will then still may comprise an end stop, for example for installation and/or rigging or as a catcher if the brake fails.

In an embodiment, the actuating system further comprises a control unit adapted to control the one or more brakes to selectively switch the one or more brakes between the engaged mode and the disengaged mode. The control unit may be, e.g., part of an overall foldable wing system control unit, or may be, e.g., a separate control unit connected to the overall foldable wing system control unit. The control unit may be coupled to brake actuators for actuating engagement and/or disengagement of the brakes. Such brake actuators may be, e.g., electric, pneumatic or hydraulic actuators.

In an exemplary embodiment, for each of the one or more brakes the associated first component is part of the actuator or coupled between the actuator and the tip section. In particular, for each of the one or more brakes the associated first component is an output element of the actuator, an internal element of the actuator or a transmission element coupled between an output element of the actuator and the tip section. The output element of the actuator may be, e.g., an output shaft in the case of a rotary actuator, a piston rod in the case of a linear hydraulic actuator or any other output element of a suitable actuator. If the first component is an output element of the actuator or an internal element of the actuator, the respective brake may be provided on or in the actuator. If the first component is a transmission element coupled between an output element of the actuator and the tip section, the respective brake may be provided spaced from the actuator.

In an exemplary embodiment, each of the one or more brakes is an electric brake, a hydraulic brake or a pneumatic brake.

In an exemplary embodiment, one or more, and each of the one or more brakes, is a power-off brake which is only in the disengaged mode if power is applied to the brake and which is in the engaged mode upon loss of power. Thus, it is necessary to provide power to the brake in order to switch it from the engaged mode to the disengaged mode and to maintain it in the disengaged mode. In case of loss of power, the brake automatically switches to the engaged mode, thereby ensuring that the tip section is retained in the folded position even if power to the brake fails. It should be noted that a power-off brake may also be referred to as pressure-off brake in the case of brakes relying on pressure for their operation such as, e.g. hydraulic or pneumatic brakes being operated by hydraulic or pneumatic power. It should also be noted that, alternatively or additionally, it is in principle also possible to configure one or more or even all of the brakes as an active brake where engagement or both engagement and disengagement are driven by electric, hydraulic or pneumatic power. An example for such active brakes are multiple disk brakes, in which the braking force is generated by friction between the main surfaces of multiple disks, which are brought into contact with each other in the engaged mode.

In an embodiment, the one or more brakes are the only means of the wing arrangement adapted to secure the tip section in the folded position. This disregards the possibility of using the actuator for this purpose. In other words, there is no latching device, separate from the actuator and the one or more brakes, for latching the tip section in the folded position. As already noted above, such an arrangement provides the advantage that no accurate positioning of the tip section in the folded position is necessary and, therefore, no positioning of the tip section against an end stop is required.

In an alternative embodiment, the wing arrangement comprises, in addition to the one or more brakes, a latching device having one or more latching elements which are selectively movable between a latching position and a release position, by one or more latching actuators of the latching device. When the tip section is in the folded position and the one or more latching elements are moved from the release position to the latching position the one or more latching elements engage one of the tip section and the base section in a form fitting manner and thereby prevent the tip section from moving out of the folded position. When the tip section is in the folded position and the one or more latching elements are moved from the latching position to the release position the tip section or the base section is able to disengage from the one or more latching elements, and the latching device allows for movement of the tip section from the folded position into the deployed position. In this case, the latching device or the one or more brakes may be utilized as a failsafe solution. For example, the one or more brakes may be configured and operated as a backup or failsafe solution for the latching device, so that the latching device can be designed to have a lower reliability, while the system as a whole obtains a higher reliability. When the latching device fails, the one or more brakes then still maintain the tip section in the folded position, so that, e.g., the aircraft is able to proceed to the gate in this situation, in spite of the failed latching device. In this regard it should be noted that these embodiments may be configured such that the backup or failsafe function is only provided for one of the folded position and the deployed position or for both of these positions.

In an embodiment, in which there may be no latching device for the folded position and/or the deployed position, the wing arrangement further comprises a catching device having one or more catching elements which are selectively movable between a catching position and a release position, by one or more catching actuators of the catching device. When the tip section is in the folded position and the one or more catching elements are moved from the release position to the catching position the one or more catching elements are positioned such that they are spaced from the tip section and, when the tip section moves from the folded position to the deployed position—e.g. due to brake or system failure—, the tip section abuts the one or more catching elements upon reaching a limit position between the folded position and the deployed position, thereby preventing further movement of the tip section towards the deployed position. The spacing between the one or more catching elements and the tip section in the folded position determines the limit position. The limit position may be much closer to the folded position than to the deployed position and, may be as close to the folded position as the overall design allows, and is, e.g., spaced from the folded position by at most 5%, may be at most 4%, or at most 3%, even at most 2% and 1% of the spacing between the folded and deployed positions. When the tip section is in the folded position and the one or more catching elements are moved from the catching position to the release position the one or more catching elements allow for movement of the tip section from the folded position into the deployed position. Thus, the catching device—when in the catching position—is operable to prevent movement of the tip section from the folded position into the deployed position in case of failure of the one or more brakes. Simply put, in the case of an upwardly foldable tip section, the catching device then prevents the tip section from falling down. Rather, the movement is limited to the limit position, which can be suitably chosen. However, due to the spacing between the one or more catching elements and the tip section in the folded position, no accurate positioning of the tip section is required prior to moving the catching elements into the catching position. It should be noted that an end stop may act as additional catcher in the opposite direction.

It should generally be noted that the one or more brakes may also be used during direction reverse, i.e. when the direction of movement of the tip section changes, and/or during start up, either when unloading the latching device by driving the tip section against the end stop prior to unlatching and then driving in the opposite direction, and/or if e.g. the pilot reverses his selection of tip section movement halfway through the operation and/or for normal control, such as pre-loading of the actuator or motor before the one or more brakes are released in order to not have a runaway start.

In an exemplary embodiment, the wing arrangement further comprises an end stop arranged and adapted such that, upon movement of the tip section from the deployed position towards the folded position, the tip section abuts the end stop when reaching the folded position and the end stop prevents further movement of the tip section beyond the folded position. Thus, in the folded position the tip section is secured against movement in a direction away from the deployed position by the end stop, so that the one or more brakes merely need to secure it against movement in the opposite direction. The end stop is particularly advantageous in the above embodiment employing a catching device, because then upon failure of the one or more brakes the position of the tip section is limited in a very simple and reliable manner to the range between the folded position and the limit position. A separate such end stop may be provided for the deployed position.

In an embodiment, the one or more brakes are adapted to be selectively switched between an engaged mode and a disengaged mode when the tip section is in one or more intermediate positions, and in any possible intermediate position, between the folded position and the deployed position, such that in the engaged mode the one or more brakes secure the tip section in the respective intermediate position by applying a braking force to the associated one of the one or more first components preventing movement thereof, and in the disengaged mode movement of the tip section between the folded and deployed positions is allowed. In this manner, the position of the tip section can be reliably and flexibly adjusted to meet particular conditions and requirements. This may be advantageous, e.g., for maintenance purposes.

In an exemplary embodiment, the actuating system comprises two or more of the brakes, wherein each of these brakes is adapted to secure or latch, in the engaged mode, the tip section in the folded position or an intermediate position independent of the other ones of the brakes. In other words, the two or more brakes provide for redundancy.

Generally, each of the one or more brakes may comprise a first brake part, which is fixedly secured with respect to the base section, the tip section or a housing of the actuator, and a second brake part fixedly secured to the associated first component. The first and second brake parts may be arranged such that they rotate relative to one another about a brake axis during movement of the tip section between the deployed and folded positions. The first and second brake parts may further be configured to engage each other in the engaged mode and to be disengaged from each other in the disengaged mode. Further, the brake parts may have engagement surfaces extending transverse or in parallel to the brake axis, so that they can be moved into engagement along the brake axis or transverse to the brake axis. By such brake parts a simple, flexible and efficient brake can be formed. For example, in particular in the case of power-off brakes, each of the brakes may be, e.g., a freewheel brake or power-off disk brake allowing relative movement of the first and second brake parts in the direction to the folded position and restricting relative movement of the first and second brake parts in the opposite direction. Further, the brake parts might have engagement surfaces extending transverse or in parallel to the brake axis, so that they can be moved into engagement along the brake axis or transverse to the brake axis. By such brake parts a simple, flexible and efficient brake can be formed.

The wing arrangement according to any of the above-described embodiments may be part of an aircraft. The aircraft further comprises a fuselage, wherein the first end portion of the base section is attached to the fuselage and the base section is arranged between the fuselage and the tip section.

BRIEF DESCRIPTION OF THE DRAWINGS

For an understanding of embodiments of the disclosure, reference is now made to the following description taken in conjunction with the accompanying drawings, in which.

DETAILED DESCRIPTION OF SOME EMBODIMENT

Some embodiments will now be described with reference to the Figures.

Figure 1:
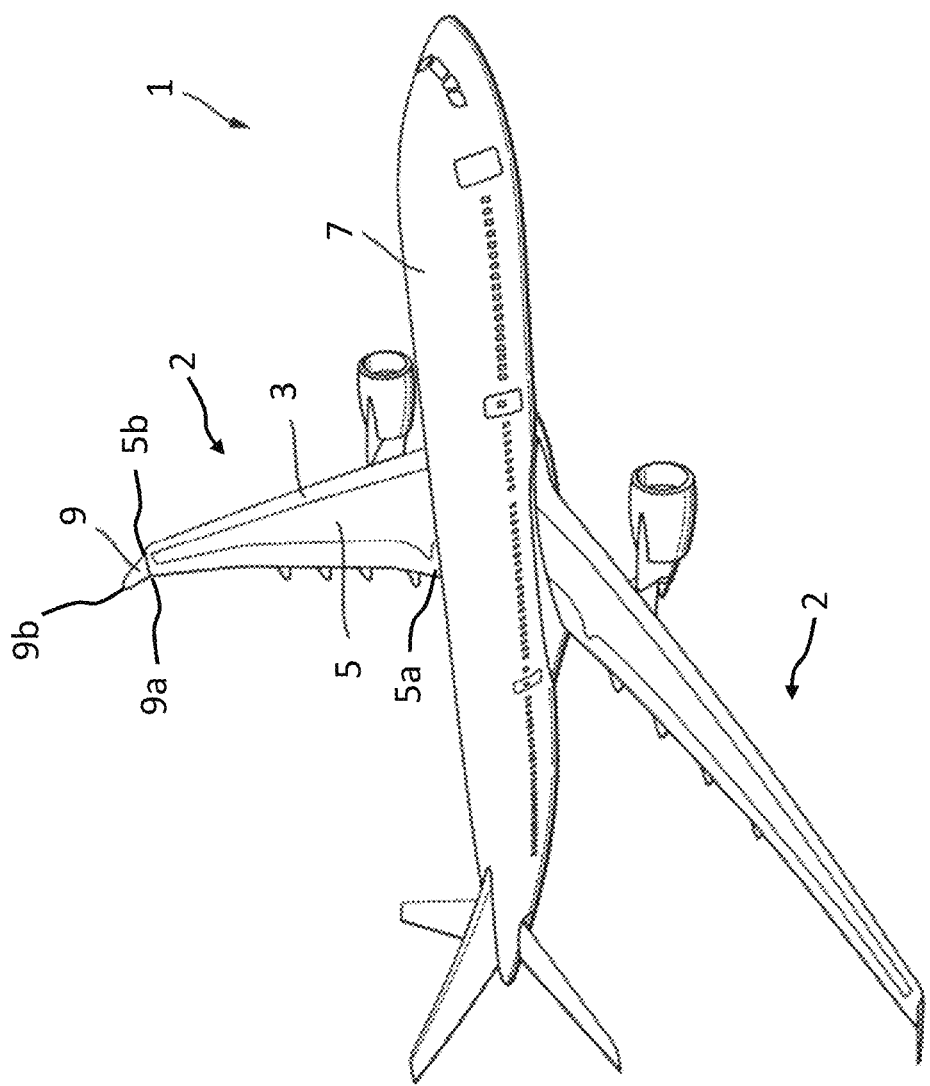
FIG. 1 shows a schematic perspective view of an aircraft according to an embodiment of the invention.

FIG. 1 shows a schematic perspective view of an aircraft 1 which comprises two wing arrangements 2 according to the present invention. The aircraft 1 also comprises a fuselage 7 extending along a longitudinal axis which corresponds to the x-axis of the aircraft 1. Each of the wing arrangements 3 comprises a wing 3 that extends away from the fuselage 7, and each wing 3 comprises a base section or fixed wing 5 and a tip section or foldable wing tip portion 9. The base section 5 has a first or inboard end portion 5a, which is configured or adapted to be coupled to the fuselage 7 and is shown to be coupled to the fuselage 7, and an opposite second or outboard end portion 5b spaced from the fuselage 7 by the remainder of the base section 5.

The tip section 9 of the wing 3 is pivotably connected to the second end portion 5b of the base section 5. More particularly, the tip section 9 extends away from the second or outboard end portion 5b of the base section 5 and comprises a third or inboard end portion 9a and an opposite fourth or outboard end portion 9b spaced from the base section 5 by the remainder of the tip section 9. The fourth end portion 9b may be provided by a part of a wing tip device, which itself is a part of the tip section 9. The third end portion 9a is pivotably mounted on or coupled to the second end portion 5b of the base section 5 in such a manner that the tip section 9 is able to pivot between a deployed position and a folded or stowed position about a pivot axis 13 (see FIG. 4).

The pivot axis 13 generally extends in a direction between a leading edge and a trailing edge of the respective wing 3 and, for example, parallel or essentially parallel to the longitudinal axis of the aircraft 1, i.e., in the flight direction. In the deployed position illustrated in FIGS. 2 and 3 the tip section 9 extends essentially along the longitudinal axis of the base section 5, and in the folded position the tip section 9 is angled upwardly with respect to the longitudinal axis of the base section 5, as can be seen in FIG. 4, which will be described in detail below, so that the spanwise length of the wing 3 is decreased. Thus, in the deployed position the fourth end portions 9b or the outermost outboard ends 9b of the tip sections 9 of the wings 3 have a larger distance than in the folded position, so that the wingspan of the aircraft 1 can be selectively decreased by moving the tip sections 9 of the wings 3 from the deployed position into the folded position in order to allow for the use of infrastructure adapted to aircraft of such reduced wingspan and in order to save on airport fees, and increased in order to allow for reduced fuel consumption during flight.

Figure 2:
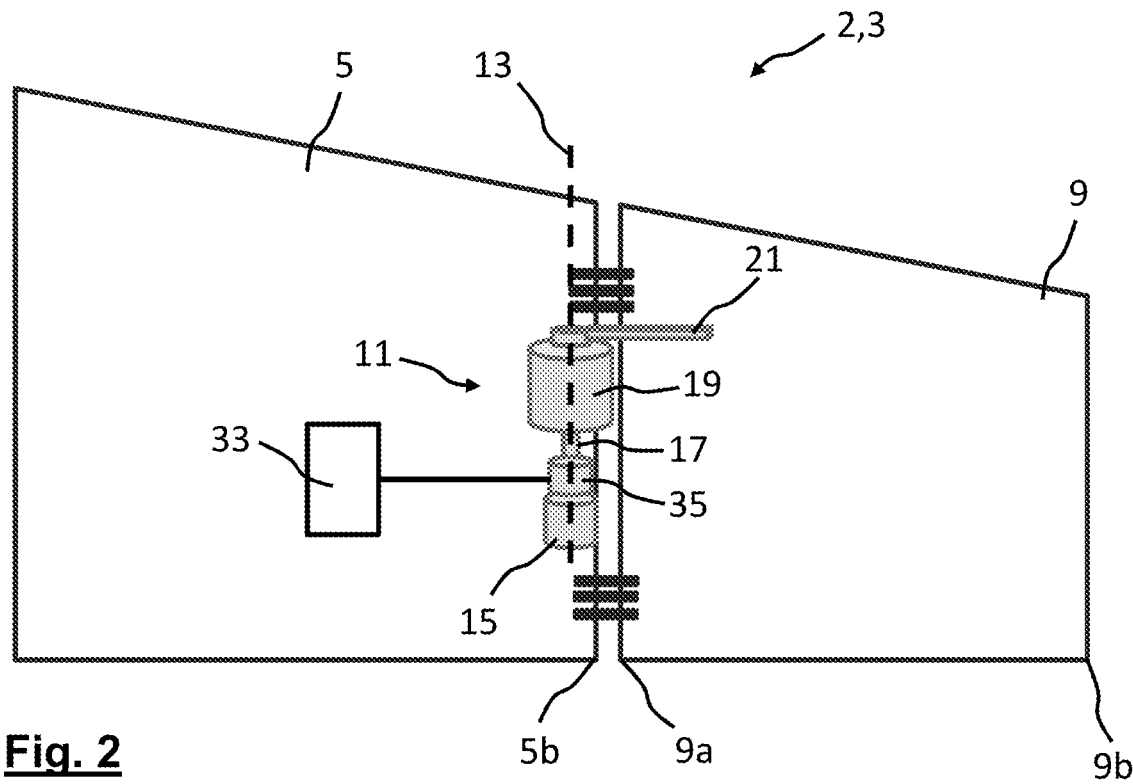
FIG. 2 shows a schematic top view of a first embodiment of a wing arrangement according to an embodiment of the invention.
Figure 3:
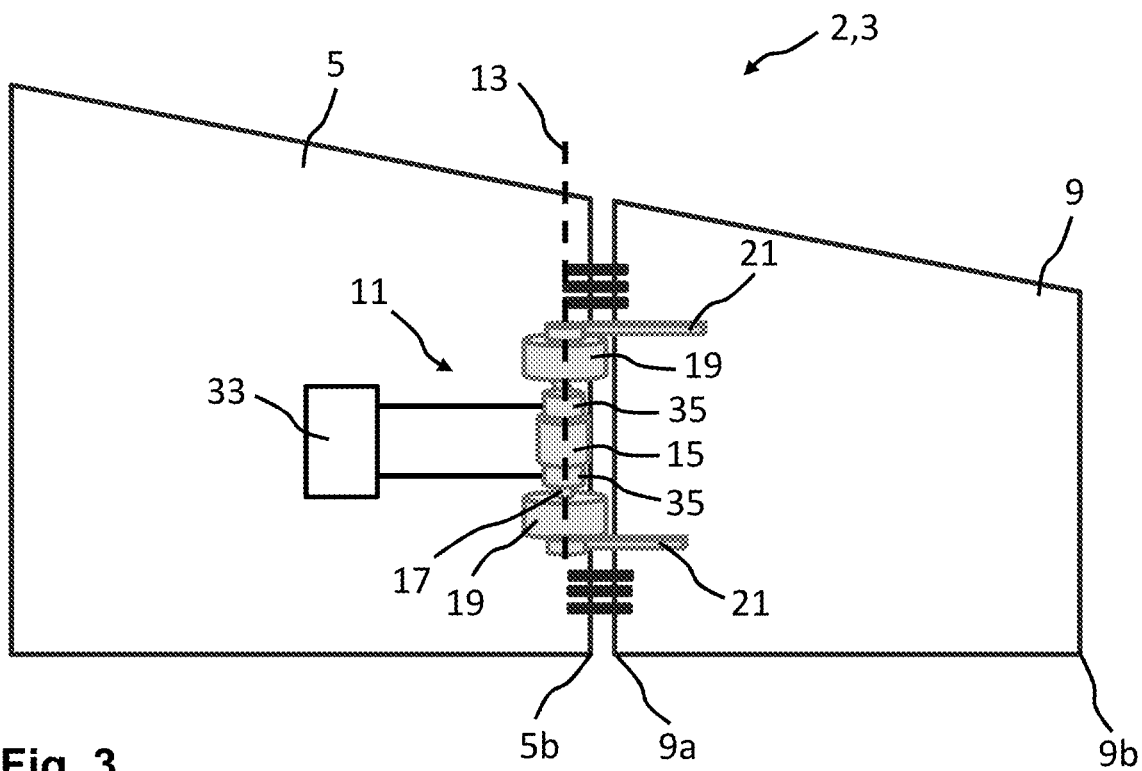
FIG. 3 shows a schematic side view of a second embodiment of a wing arrangement; and, FIG. 4 shows a schematic side view of the wing arrangements shown in FIGS. 2 and 3 with the tip section in the folded position.
Figure 4:
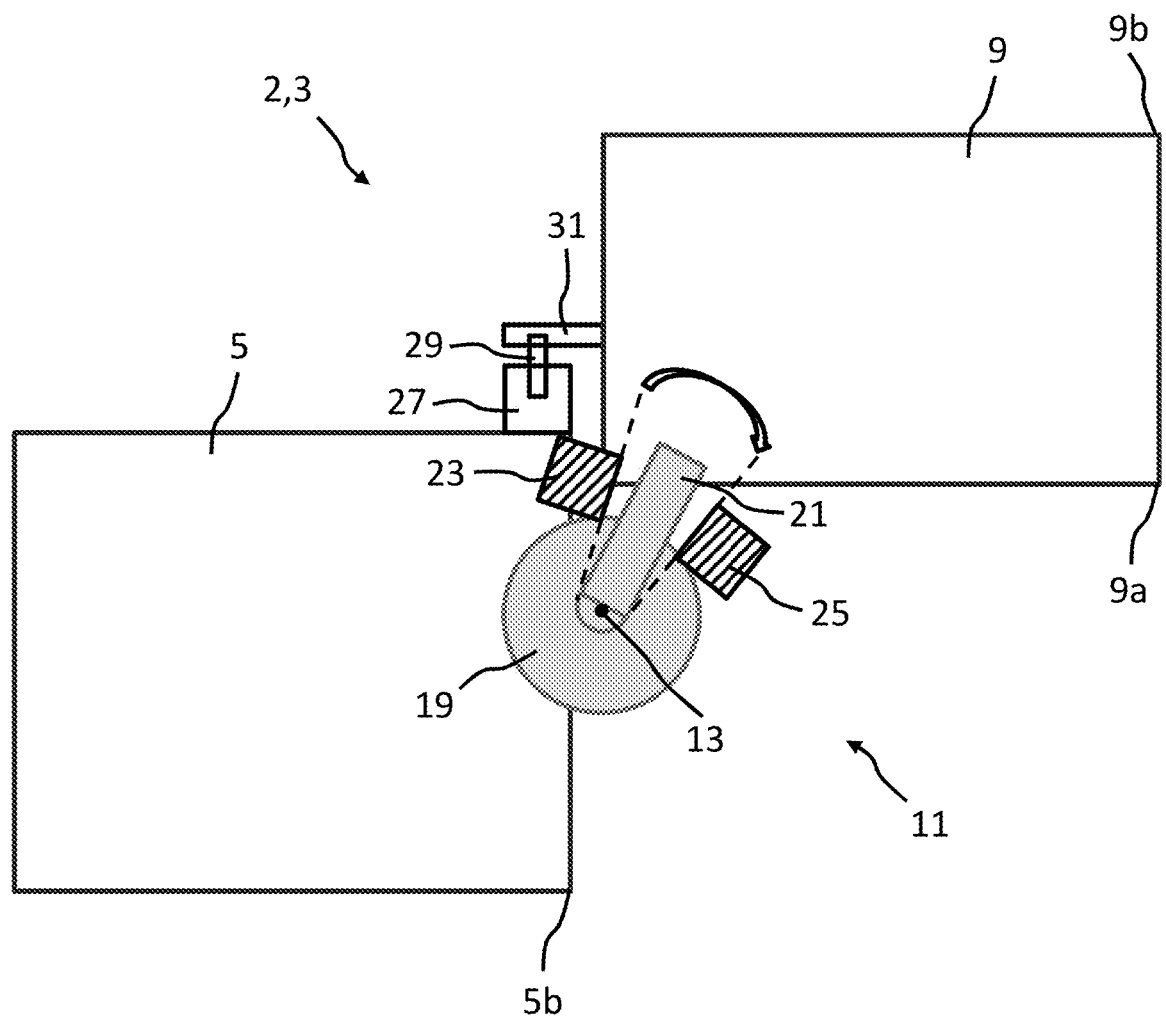

In order to effect the pivotal movement of the tip section 9 between the deployed and the folded positions, each of the wing arrangements 2 comprises an actuating system 11, which is schematically illustrated in FIGS. 2 to 4 to be described further below.

The actuating system 11 comprises a rotary actuator 15, such as an electric motor, which is coupled to the base section 5 and, via an output shaft 17 of the rotary actuator 15, one or two gearboxes 19 and a link 21 to the tip section 9 (see FIGS. 2 and 3 and FIG. 4). Thus, upon actuating the rotary actuator 15, the output shaft 17, which constitutes an output element of the rotary actuator 15, is rotated, and this rotary actuating movement is transferred via the gearbox or gearboxes 19 to a link or links 21, thereby selectively moving the tip section 9 between the deployed and folded positions. As can be seen in FIG. 4, the folded position is defined by a structural end stop 23, against which the link or links 21 abut when the tip section 9 reaches the folded position.

In order to be able to securely maintain the tip section 9 in the folded position the actuating system 11 also comprises one (in the embodiment of FIG. 2) or two (in the embodiment of FIG. 3) brakes 35, which are provided on the actuator 15 and are adapted to be selectively switched by a control unit 33 between an engaged mode, in which a braking force is applied to the output shaft 17 preventing further rotation of the output shaft 17, and a disengaged mode, in which the braking force is released and the brake or brakes 35 do not prevent rotation of the output shaft 17. Each of the brakes 35 may be a power-off brake, such as a freewheel brake or a power-off disk brake. However, it is also possible to configure the brakes 35 as active brakes where engagement and disengagement of the brakes is driven by electric, pneumatic or hydraulic power.

Further, the wing arrangement 2 also comprises, for each of the links 21, a catching device in the form of a movable catching element 25 (see FIG. 4), which is selectively driven by a corresponding catching actuator between the catching position shown in FIG. 4 and a release position, in which the catching element 25 is moved perpendicularly with respect to the plane of FIG. 4. In the catching position the catching element 25 extends into the path of the link 21 when the tip section 9 moves from the folded position towards the deployed position. Consequently, the catching element 25, which is spaced from the end stop 23 along this path, limits, together with the end stop 23, the range of movement of the link 21 and, accordingly, the range of movement of the tip section 9. Thus, the catching element 25 prevents the tip section 9 from falling down from the folded position in case the brakes 35 should fail. By contrast, in the release position the catching element 25 no longer extends into the path of the link 21, so that movement of the tip section 9 into the deployed position is no longer prevented by the catching device.

Moreover, the wing arrangement 2 may optionally comprise, in addition to the one or more brakes 35, a latching device 27 comprising a latching bolt 29, which can be selectively moved between an extended or latching position shown in FIG. 4 and a retracted or release position. In the latching position, the latching bolt 29 engages a projection 31 on the tip section 9 when the tip section 9 is in the folded position, thereby latching the tip section 9 in the folded position. Upon retracting the latching bolt 29 into the release position, the latching bolt 29 disengages from the projection 31, therefore no longer preventing movement of the tip section 9 out of the folded position.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing arrangement for an aircraft, comprising:
    a wing having
        a base section with a first end portion configured to secure to a fuselage of the aircraft, and an opposite second end portion, and
        a tip section with a third end portion and an opposite fourth end portion, wherein the third end portion is pivotably connected to the second end portion such that the tip section is selectively pivotable about a tip section pivot axis between a deployed position and a folded position in which the spanwise length of the wing is smaller than in the deployed position, and
    an actuating system including an actuator and coupled between the base section and the tip section such that the actuator is operable to selectively move the tip section between the deployed position and the folded position, wherein the actuating system comprises
        at least one link arranged and adapted to pivot upon operating the actuator and transferring a rotary actuation movement to the tip section in order to effect the selective movement of the tip section between the deployed and folded positions, and
        at least one brake adapted to be selectively switched between an engaged mode and a disengaged mode when the tip section is in the folded position, such that in the engaged mode the at least one brake secures the tip section in the folded position by applying a braking force to an associated one of the at least one link preventing movement the tip section, and in the disengaged mode movement of the tip section between the folded and deployed positions is allowed, and
    a catching device having at least one catching element which is selectively movable between a catching position and a release position, wherein the at least once catching element is configured to abut against the link to limit the movement of the tip section from falling down from the folded position.

2. The wing arrangement according to claim 1, wherein for each of the at least one brake the associated link is
    an output element of the actuator or an internal element of the actuator, wherein the respective one of the at least one brake is provided on or in the actuator, or
    a gearbox coupled between an output element of the actuator and the tip section, wherein the respective one of the at least one brake is provided spaced from the actuator.

3. The wing arrangement according to claim 1, wherein the actuating system further comprises a control unit adapted to control the at least one brake to selectively switch the at least one brake between the engaged mode and the disengaged mode.

4. The wing arrangement according to claim 1, wherein each of the at least one brake is an electric brake, a hydraulic brake or a pneumatic brake.

5. A wing arrangement for an aircraft, comprising;
    a wing having
        a base section with a first end portion configured to secure to the fuselage of the aircraft, and an opposite second end portion, and
        a tip section with a third end portion and an opposite fourth end portion, wherein the third end portion is pivotably connected to the second end portion such that the tip section is selectively pivotable about a tip section pivot axis between a deployed position and a folded position in which the spanwise length of the wing is smaller than in the deployed position, and
    an actuating system including an actuator and coupled between the base section and the tip section such that the actuator is operable to selectively move the tip section between the deployed position and the foldeed position, wherein, the actuating system comprises
        at least one link arranged and adapted to pivot upon operating the actuator and transferring a rotary actuation movement to the tip section in order to effect the selective movement of the tip section between the deployed and folded positions, and
        at least one brake adapted to be selectively switched between an engaged mode and a disengaged mode when the tip section is in the folded position, such that in the engaged mode the at least one brake secures the tip section in the folded position by applying a braking force to an associated one of the at least one link preventing movement the tip section, and in the disengaged mode movement of the tip section between the folded and deployed positions is allowed, and
    wherein each of the at least one brake is a power-off brake which is only in the disengaged mode when power is applied to the brake and which is in the engaged mode upon loss of power.

6. The wing arrangement according to claim 1, wherein the at least one brake is the only means of the wing arrangement adapted to secure the tip section in the folded position.

7. The wing arrangement according to claim 1, further comprising a latching device having at least one latching element which is selectively movable between a latching position and a release position, wherein
    when the tip section is in the folded position and the at least one latching element is moved from the release position to the latching position the at least one latching element engages one of the tip section and the base section and preventing the tip section from moving out of the folded position, and
    when the tip section is in the folded position and the at least one latching element is moved from the latching position to the release position the tip section or the base section is able to disengage from the at least one latching element, so that the latching device allows for movement of the tip section from the folded position into the deployed position.

8. The wing arrangement according to claim 1, further comprising an end stop arranged and adapted such that, upon movement of the tip section from the deployed position towards the folded position, the tip section abuts the end stop when reaching the folded position and the end stop prevents further movement of the tip section beyond the folded position.

9. The wing arrangement according to claim 1, wherein the at least one brake is adapted to be selectively switched between an engaged mode and a disengaged mode when the tip section is in at least one intermediate position between the folded position and the deployed position, such that in the engaged mode the at least one brake secures the tip section in the respective intermediate position by applying a braking force to the associated one of the at least one link preventing movement of the tip section, and in the disengaged mode movement of the tip section between the folded and deployed positions is allowed.

10. The wing arrangement according to claim 1, wherein the actuating system comprises at least two of the brakes, wherein each of the at least two brakes is adapted to secure, in the engaged mode, the tip section in the folded position independent of the other ones of the at least two brakes.

11. An aircraft comprising a fuselage, and a wing arrangement according to claim 1, wherein the first end portion of the base section is attached to the fuselage and the base section is arranged between the fuselage and the tip section.

* * * * *